Figure 1:
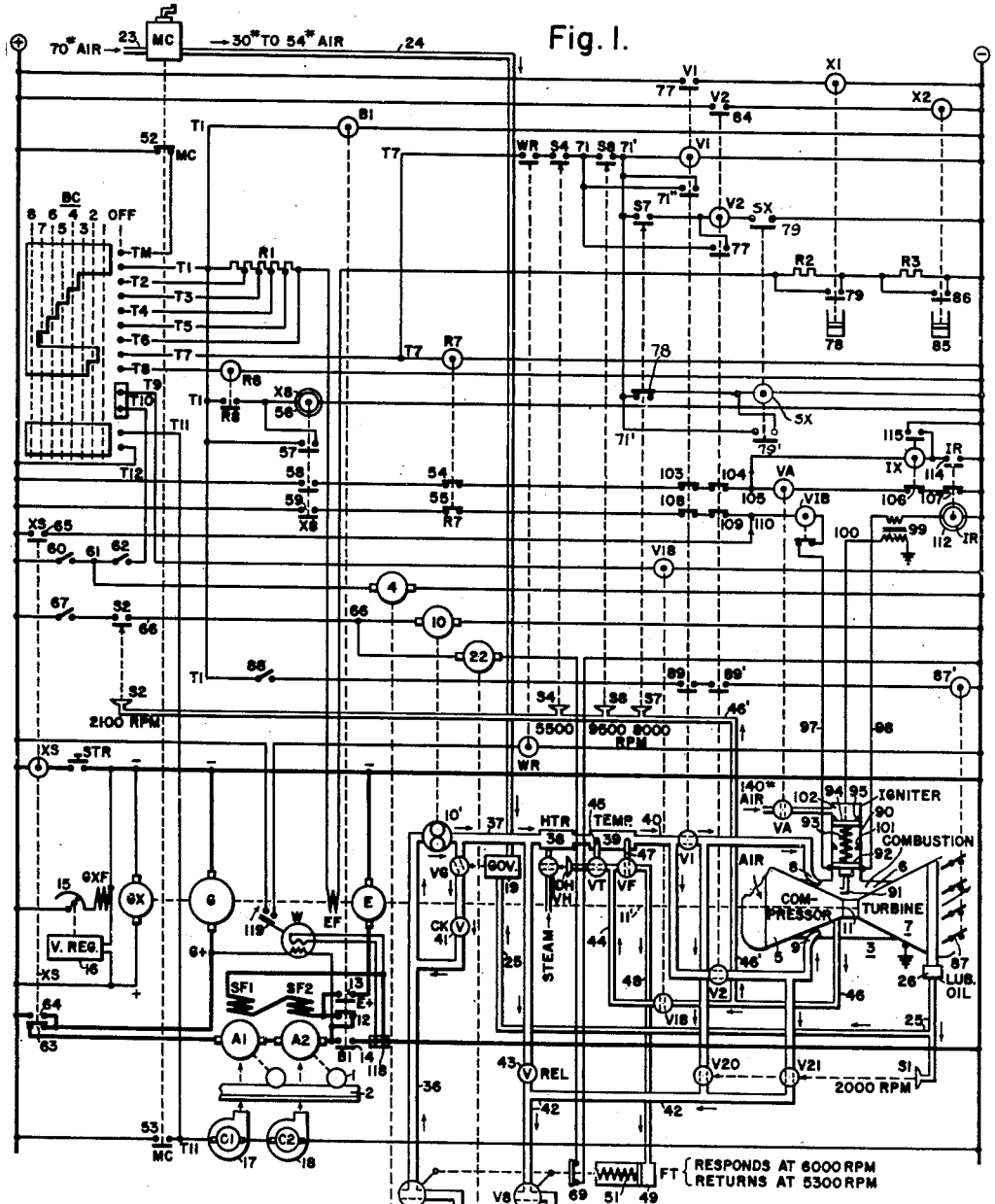

March 22, 1955   J. J. STAMM   2,704,813
RECUPERATIVE BRAKING FOR ENGINE-POWERED LOCOMOTIVES
Original Filed April 30, 1953

United States Patent Office 2,704,813
Patented Mar. 22, 1955

2,704,813

RECUPERATIVE BRAKING FOR ENGINE-POWERED LOCOMOTIVES

John J. Stamm, Export, Pa., assignor to Westinghouse Electric Corporation, East Pittsburgh, Pa., a corporation of Pennsylvania Continuation of application Serial No. 352,089, April 30, 1953. This application May 10, 1954, Serial No. 428,539

16 Claims. (Cl. 290—17)

This application is a continuation and a replacement of my application, Serial No. 352,089, filed April 30, 1953.

My invention relates to engine-powered locomotives or other self-propelled vehicles, and it has particular relation to an improved means for absorbing braking-power in the engine and in the auxiliaries which derive their power from the engine. While certain features of my invention are applicable to mechanical or gear-drives between the engine and the drive-wheels of the locomotive, my invention was primarily designed, and is particularly adapted, for an electric drive, using an engine-driven generator which supplies power to electric traction-motors. In such an installation, during dynamic braking, the traction-motors act as generators, supplying power to the generator which acts as a motor, driving the engine, and preferably also driving the rather large amount of auxiliary equipment which has to be driven.

My invention is broadly applicable, in some of its aspects, to the use of any kind of engine or prime mover; but my invention was primarily designed, and is pre-eminently adapted, for use in a gas-turbine locomotive. Gas-turbines have a number of well-known pecularities which impose severe limitations on the manner of their use. They are characterized by a high fuel-cost during idling; they entail an expenditure of some two-thirds of their developed horsepower in driving the air-compressors which are necessary to supply air to their combustion-chambers; and they commonly operate on two kinds of fuel, usually oil. That is, they normally operate on an inexpensive heavy fuel-oil which has to be preheated; but they require to be started on a more expensive light fuel-oil, usually referred to as diesel oil; and they also require to be transferred back to light-oil consumption during the process of shutdown, so that the heavy oil will be flushed out of the piping, so as to avoid stoppage of the piping which would occur if the heavy oil were allowed to congeal therein.

For the foregoing reasons, and perhaps other reasons, it has not been economically feasible to take care of the dynamic-braking requirements of a gas-turbine locomotive, in the same manner which has been provided, for its predecessor, the diesel-electric locomotive. When dynamic braking is provided on a locomotive, it is ordinarily used, not for braking the train to a stop (which must be done by air-brakes installed on each car of the train), but for holding the train back, against runaway, on long down-grades, or for enabling the engineman to take up the slack, in manipulating his controls, preliminary to a successful air-brake application. These requirements are particularly felt in freight-train operation, where the number of cars per train is vastly greater than in passenger service, and where long grades are sometimes encountered, requiring as much as an hour or more to be negotiated.

During all the time when dynamic braking is being applied, in an engine-powered, electrically driven locomotive, it is necessary to maintain the operation of an auxiliary power plant, including such services as compressors for the air-brake system, blowers for cooling the traction-motors, a battery-charging generator, sometimes a variable-voltage exciter, and many other auxiliary power-purposes. In locomotives which have been powered with diesel engines, it has been customary to permit the diesel engines to continue to operate, during prolonged dynamic-braking periods, so that these auxiliary power-requirements could be provided for, by the main diesel engine or engines in such diesel-powered locomotives; and it has also been customary to absorb the braking-power in blower-ventilated resistor-grids, in lieu of feeding power back into the generator to cause the latter to act as a motor for driving the diesel engine during the braking period. One cogent reason for this formerly used resistor-grid method of dynamic braking has been the fact that a diesel engine is not normally capable of absorbing anywhere near the required amount of braking-power, without running the engine at prohibitively excessive speeds.

When gas-turbine locomotives began to be developed, their high fuel-cost during idling made it impractical to continue to operate the gas turbines during the usually prolonged periods of dynamic braking. One competitive gas-turbine locomotive-manufacturer has solved this problem by shutting down the gas-turbine unit, when going into dynamic braking, and by installing an auxiliary diesel-engine generator-set, which was large enough to meet the auxiliary power-requirements which had to be maintained during the braking period. The actual braking-power, in these competitive gas-turbine locomotives, was absorbed by means of air-cooled braking-resistors.

My present invention takes advantages of the peculiar characteristic of a gas turbine, whereby it uses up such a large amount of its developed horsepower in its air-compressor, thus making it preeminently suited for absorbing the dynamic-braking power. Tests have shown that, if all fuel-input into a gas-turbine is cut off, at some time during the preliminary stages of dynamic or regenerative braking, while continuing to admit air into the air-compressor, an ordinary gas-turbine unit will be able, in accordance with my invention, to absorb very nearly the total required braking horsepower, when the turbine-unit is being driven, by regenerative braking-power, at its maximum safe speed; and this does not include the transmission-losses, in the gearing, and in the motors and generators, which would usually suffice to bring the total absorbed power practically up to the dynamic-braking capabilities which are desired for successful train-operation.

Furthermore, if any further braking is required, in certain applications of my invention, I may provide means for controllably restricting the air-discharge from the prime mover, in order to make it absorb more braking-energy. This discharge-restricting procedure may be adopted, without fear of backfires, or of driving gas-fumes up into the locomotive or vehicle, because it would be done at a time when all gas-input has been shut off from the engine, while the air-input is maintained undisturbed. This expedient, of restricting the air-discharge which is delivered by an air-compressor, can also be applied to a diesel engine, which commonly uses an air-compressor called a supercharger, thus making my invention applicable to other types of engines, other than gas-turbines.

According to my present invention, therefore, the auxiliary power-requirements may be drawn directly from the main power plant, during dynamic braking as well as during monitoring-operations, thus avoiding the necessity for an auxiliary prime mover for this purpose. The principle of cutting off the fuel-input which is commonly needed for idling purposes, as soon as the braking power becomes sufficient to drive the main power-plant, with its connected auxiliary power-load, overcomes the objection in regard to the high cost of the idling fuel-consumption of a gas turbine, and it also avoids the cost of an auxiliary engine for supplying the auxiliary power-requirements during dynamic braking, thus actually saving fuel, by supplying all of these auxiliary power-requirements from the regenerative use of the dynamic-braking power. On a typical gas-turbine locomotive, rated at 3,000 horsepower, for example, I can thus save some $3,000 in the cost of braking-resistor grids and their fans and cubicle, another $1,000 in the avoidance of the 100 to 150 horsepower requirement of an auxiliary power plant, and other savings, in space and weight, which might be conservatively set at $2,000, making a total of something like $6,000 per locomotive, besides producing equipment which, in many respects, has superior performance-characteristics.

Figure 2:
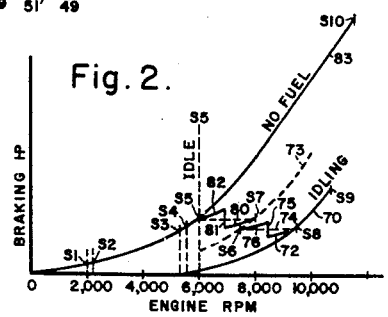

With the foregoing general objects in view, as well as many ancillary objects which will be set forth hereinafter, my invention consists in the systems, circuits, apparatus, combinations, parts, and methods of design and control, which are hereinafter described, and illustrated in the accompanying drawing, wherein:

Figure 1 is a very much simplified diagrammatic view of circuits and apparatus, embodying my invention in an illustrative preferred form of embodiment, omitting many known parts, interlocks and safeguards which would be needed in any practicable application of my invention, but which are well understood to those skilled in the art, and are not needed to an understanding of the novel features of my present invention, and Fig. 2 is a curve-diagram which will be referred to in the explanation of the operation.

As shown by the heavy lines in Fig. 1, I provide a main electric drive, which consists of one or more main, direct-current generators G, which energize one or more traction-motors which are represented by their armatures A1 and A2. The traction-motors A1 and A2 are connected to drive-wheels 1, which are supported on rails 2, this being intended as a diagrammatic representation of a locomotive or other self-propelled vehicle.

The generator G is normally driven by a fuel-consuming prime mover, which is illustrated in the form of a gas turbine 3 comprising an air-compressor 5, one or more combustion-chambers 6, and a turbine-proper 7. Fuel is fed into the combustion-chambers 6 by a suitable combustion-means, shown in a form of a plurality of nozzles or burners 8 and 9, which inject a finely atomized spray of fuel-oil into the combustion-chambers 6, where said oil burns in compressed air which is supplied by the compressor 5.

The turbine 7 operates on the products of the combustion which takes place in the combustion-chamber 6, and it is provided with a means, such as a shaft 11, which serves as a drive-connection to the air-compressor 5, and also a part, such as the shaft-extension 11', which serves as a drive-connection to the main generator G and to certain other power-consuming means, such as an exciter E, and an auxiliary-power generator GX. In most electrically driven gas-turbine locomotives, such as the one which I have chosen for illustration, the turbine-unit 3 serves to drive both the compressor 5 and the useful power-consuming load-equipment such as G, E and GX. So far as my present invention is concerned, however, it is not necessary for the two drive-connections 11 and 11' to be mechanically connected together during the motoring operation, when the traction-motors A1 and A2 are supplied with power which is derived from the turbine 7, but it is necessary that these two drive-connections 11 and 11' shall be mechanically connected together at least during the dynamic-braking operations, which will be subsequently described, so that, when the main generator G is operating as a motor, driving the turbine 7, it will also drive the air-compressor 5 which absorbs the braking-energy.

It will be understood, that while I have shown simple drive-shaft connections 11 and 11', or direct-drive connections, between the turbine 7, its compressor 5, and the various useful load devices G, E and GX, it is entirely possible, and usually the practice, for some or all of these connections to use gear-drive connections, which have been omitted in order to avoid the complication of my drawing by features which are not necessary to an understanding thereof.

The traction-motors A1 and A2 are shown, by way of giving some concrete illustration, as being series direct-current motors, having series field windings SF1 and SF2, respectively, although it should be understood that I am not limited to the use of series motors, as distinguished from shunt or separately excited motors. In the very much simplified diagram which I have chosen for illustrative purposes, the two traction-motors are connected in series with each other, and I have not shown the usual provisions for transitions to and from different motor-combinations, such as series, series-parallel, or parallel motor-connections, which are well understood in the art, and which would normally be used with my invention. Also for the purpose of simplicity and clearness of illustration, without encumbering the diagrams with known features, I have refrained from showing the well-known reversing-switches, which enable the locomotive to go either forward or backward, or the well-known field-weakening means, whereby the motors can be operated, at times, with weakened fields, these features being well known and being unnecessary to an understanding of my present improvements.

In some of the broader aspects of my invention, any sort of prime mover or drive-means or power-interchanging means may be used, whereby the prime mover 3 may be operated at some idling speed without substantial power-interchange with the drive-wheel 1, at times when the vehicle is to be at standstill; whereby a driving torque may be transmitted to the drive-wheel 1 of the vehicle from a shaft 11' of the prime mover 3, at times when a propelling power is to be applied to the vehicle; and whereby a driving torque may be transmitted back to a shaft 11' or 11 of the prime mover 3 from said drive-wheel 1, at other times when the motion of the vehicle is to be braked. In the broadest aspects of my invention, this power-interchanging means may be any sort of drive, although there are many advantages in an electric drive, some of which advantages will be subsequently pointed out.

It is also to be understood that an electric drive, if used, may employ motors having any kinds or connections of field-windings, both during the motoring operations, and in the dynamic-braking connections.

I have chosen to illustrate an electric connection-means, which I presently prefer, wherein the motor-fields SF1 and SF2 are separately excited, during dynamic-braking operations, from the exciter E. I make the necessary connection-changes by means of a braking-relay or electrically controlled contactor B1, which has three contacts, namely, a normally closed contact or back-contact 12, which is closed when the relay B1 is unenergized, and two normally open or make contacts 13 and 14 which are open when the relay B1 is unenergized. The back-contact 12 connects the motor-fields SF1 and SF2 in series with the motor-armatures A1 and A2 during the motoring operation, and opens this connection during the braking operation. The make-contact 13 of the brake-relay B1 energizes the motor-fields SF1 and SF2 from the exciter during the braking operation. And the make-contact 14 conects the motor-armatures A1 and A2 directly across the generator-terminals of the generator G, without passing the armature-current through the field-windings SF1 and SF2, during the braking operation.

According to the conventional showing which I use, in the drawing, the braking relay B1, as well as the other, subsequently described, electrically operated relays, switches and valves, are all represented as having operating solenoids, which are represented as circles, and which are energized from battery-terminals (+) and (−). Inside of each coil is a smaller circle, representing an armature, which is considered as being gravity-biased, and as being picked up by a suitable energization of the associated coil, so as to lift the operating-stem which is actuated by that coil, and which is shown by means of a vertical dotted line. These vertical dotted relay-stems are intended as diagrammatic representations of the interconnection between the various coils and their associated contact-members or other parts. As a further convention for illustrating the interconnection or interrelationship between the various parts of any electrically operated element, I have applied the same symbol to the different parts of the element. All relay-coils are illustrated as being deenergized, so that the controlled parts are shown in the positions which they occupy in the unenergized state.

The electrical power-transfer means or load-device, which has been illustrated as the auxiliary generator GX, is intended to be representative of any kind of power-transfer means. It is intended to be representative of equipment for supplying power for the various auxiliary power purposes, on a locomotive, as has already been mentioned. The auxiliary power-plant generator GX is shown as an enlarged battery-charging generator, which is connected across the battery-terminals (+) and (−), usually through suitable reverse-current switches (not shown).

This auxiliary generator GX is shown as being provided with a shunt field-winding GXF, which is energized through a rheostat 15, under the control of a voltage-regulator 16 or other regulating-means of any type suitable for controlling a battery-charging generator. This auxiliary generator GX is shown as being large enough to supply all of the power for auxiliary power-purposes, which is needed both during the motoring operations and during the dynamic-braking operations. Two representative auxiliary power-purposes are illustrated, by way of example, as being accomplished in the illustrated form of embodiment of my invention, namely, the battery-charging function which has just been described, and the motor-cooling function, which is illustrated as being accomplished by two battery-energized blower-motors C1 and C2, driving blowers 17 and 18 for ventilating or cooling the traction-motors A1 and A2 during both motoring and braking.

While I have shown an electrical drive-connection for these blowers 17 and 18, (said electrical drive-connection involving the auxiliary generator GX and the motors C1 and C2), it is to be understood, of course, that any other drive-connection could have been used, between the turbine-shaft 11' and the blowers 17 and 18, so that these blowers would be driven whenever the gas-turbine is in operation, and at a speed corresponding to the speed of the gas turbine. It is to be understood, therefore, that the very much simplified electrical drive-connections for the blower-motors C1 and C2 are intended to be diagrammatically symbolic or representative of any suitable auxiliary power-purpose, and any suitable drive-connection therefor, whereby the necessary auxiliary power is taken from the turbine-shaft 11 or 11', at all times, during both motoring-operations and braking-operations.

As set forth more in detail in my copending application, Serial No. 340,840, filed March 6, 1953, the operation of the gas turbine 3 is under the control of a master controller MC, which is shown at the top of Fig. 1 of the accompanying drawing. This master controller MC controls the gas turbine by supplying air, at graduated pressures, (such as pressures between thirty pounds and fifty-four pounds per square inch, simply by way of example), to an engine-governor 19, which controls a governor-controlled valve VG, which controls the amount of fuel-input into the gas turbine, as will be subsequently described in more detail.

Thus, the master controller MC receives compressed air at any suitable pressure, (such as seventy pounds per square inch), and this pressure enters the master controller through a pipe 23. The master controller has an air-pressure regulating-mechanism, of the same general nature which is known in connection with the brake-valves of air-brake systems, so as to deliver output-air, at preselected pressures, depending upon the amount of movement of the controller-handle. This output-air of the master controller is supplied, by means of a pipe 24, to the governor 19. The governor 19 also receives a balancing pressure, which is obtained in an oil-pipe 25, which is connected to the lubricating-oil system of the gas turbine. For simplicity of illustration, the lubricating oil is diagrammatically represented as being circulated by means of an oil-pump 26 which is driven from the turbine 7, so that it develops an oil-pressure which is responsive to the speed of the turbine.

As previously intimated, the gas turbine 3 requires two kinds of fuel-oil, which are represented as being contained in a heavy-oil tank 27, and a light-oil tank 28, shown at the bottom of Fig. 1. A suitable illustrative automatic control-means is shown, for using these two diverse fuel-oil supply-tanks 27 and 28 in the operation of the gas turbine 3, as described and claimed in a companion application of James O. Stephens and myself, Serial No. 344,532, filed March 25, 1953. Such parts of the same as are necessary to an understanding of my present invention are shown in the accompanying drawing, which shows the heavy fuel-oil as being taken from the heavy-oil tank 27 by means of a heavy-oil circulating-pump 4', and delivered to a fuel-supply pipe 31, in which the pressure is limited by means of a relief-valve 32. In like manner, the light fuel-oil is delivered, from the tank 28, by means of a light-oil pump 22', which delivers this oil to a fuel-supply pipe 33, in which excessive pressures are relieved by means of a relief-valve 34. The heavy-oil and light-oil circulating-pumps 4' and 22' are driven by motors 4 and 22, respectively. The heavy oil in the tank 27 is so thick that it has to be maintained at a suitable temperature, such as 120° F., as by means of a steam-supply line 35, so that it will be fluid enough to be handled by the pump 4' without overloading.

The heavy and light-oil supply-pipes 31 and 33 lead into a three-way fuel-transfer valve V7, which supplies one or the other of these fuel-oils to a main fuel-supply pipe 36, which leads to a main fuel-pump 10'. This pump 10' delivers the fuel-oil through a pipe 37 to a heater 38, and thence to a temperature-control chamber 39, and thence to a fuel-supply pipe 40 for the gas turbine 3. The main fuel-pump 10' is driven by a motor 10. The rate of fuel-supply, which is supplied to the engine 3 by the fuel-pump 10', is controlled by the governor-valve VG, which bypasses the fuel-pump 10' through a check-valve 41, which permits the oil to flow, in the bypassing passage, only in the bypassing direction so that, when the main fuel-pump 10' is stopped, no material amount of fuel-oil can be supplied to the gas turbine or engine 3. The main fuel-pump 10' thus serves as an on-or-off oil-flow means, for either delivering a material oil-flow to the engine 3, or substantially stopping the same.

In my invention, the fuel-supply pipe 40 for the gas turbine is preferably divided into a plurality of branches, containing separate fuel-valves, such as V1 and V2, respectively, for separately supplying the two burners 8 and 9, or two groups of burners 8 and 9. These fuel-valves V1 and V2 are normally "on," and they are separately electrically operable to an "off" position, or fuel-exclusion position, under the control of actuating-coils or solenoids which are marked with the same designation, namely V1 and V2, respectively.

The plurality of burners, or groups of burners, 8 and 9, are provided with shutdown-valves, schematically shown at V20 and V21, respectively, whereby the fuel-input into the engine may be bypassed from the engine and drained into a drain-pipe 42, which leads to a three-way fuel-transfer drain-valve V8, through which the fuel may be drained either into the heavy-oil tank 27 or into the light-oil tank 28, according to the position of the valve. The two shutdown-valves V20 and V21 are illustrated as being automatically closed when the engine speed reaches a value of 2000 R. P. M., or other suitable value which is preferably less than the engine-starting value at which fuel is first admitted to the engine during the starting operation. This automatic speed-response is illustrated as being obtained from a diaphragm S1 which is fed from the lubricating-oil pipe 25, and which is set to be responsive at the desired speed. In ordinary practice, there would be other means (not here shown), other than the low-speed responsive diaphragm S1, for automatically turning the shut-off-valves V20 and V21 from their closed position, which they occupy when the engine is running, to an open position when the engine is to be shut down.

The main fuel-pump 10' is also protected by means of a relief-valve 43, which is connected between the delivery-pipe 37 and the drain-pipe 42, so as to protect the pump 10' against excessive pressures, in the event of a stoppage in the flow of fuel-oil to the gas turbine 3.

In addition to the heating-pipe 35 which maintains the heavy-oil tank 27 at a suitable oil-storage temperature of 120° F., or the like, it is usually necessary or highly desirable to further heat the heavy fuel-oil before it is delivered to the burners 8 and 9 of the engine. This is because the combustion of the heavy fuel-oil will be imperfect, leaving gummy deposits, unless the combustion-chamber 6, the firing nozzles 8 and 9, and the actual fuel-oil which is fed into the firing nozzles, are all at suitable elevated temperatures.

For the reasons just stated, the heater 38 is provided, to act as a second preheating means, for raising the temperature of the heavy fuel-oil to a suitable combustor-feeding temperature, such as 250° F., for example. This heater 38 may be heated by steam, which is admitted through a heater-valve VH, which is under the control of a heater-controlling diaphragm DH, which is supplied with compressed air, from a pipe 44, under the control of a thermally controlled valve VT, which is controlled by a thermometer or other thermal device 45 in the temperature-controlling chamber 39, this thermometer being set to turn the valve VT on or off at or near the desired temperature of 250°, or such other value as may be chosen.

The compressed-air pipe 44, which has just been mentioned, may be any fluid-pressure pipe, or other means, which is responsive to the speed of the engine. This pipe is illustrated as being supplied from a high-pressure outlet-air pipe 46 from the high-pressure end of the air-compressor 5. This high-pressure compressor-pipe 46 is connected to the inlet pipe 44 of the thermally controlled valve VT, through a fuel-transfer-controlling air-valve V18, which is shown as being actuated from its closed position to an open position, by means of the energization of an actuating solenoid or coil V18.

The temperature-controlling chamber 39 is also provided with a second thermometer or other thermal device 47, which controls a second fuel-transfer controlling-valve VF, causing the latter to respond to the previously mentioned fuel-coil temperature of 250° F. (for example), to thereupon change from a closed position to an open position in which it connects the speed-responsive air-pressure pipe 44 to a pipe 48 which is connected to a fuel-transfer selector-valve actuator-mechanism 49. This fuel-transfer actuator-mechanism 49 is illustrated as a piston-device, which operates against a compression-spring 51. When an adequate air-pressure is supplied to the actuator-mechanism 49, through the pipes 46, 44 and 48, corresponding to a desirable normal idling-speed of, say, 6000 R. P. M., of the engine, said mechanism moves the three-way fuel-selector valves V7 and V8 from their light-fuel position to their heavy-fuel position. When the engine-speed drops some 10 or 15% below this normal desirable idling speed, say when the engine-speed drops to 5300 R. P. M., more or less, or when a corresponding air-pressure-drop is obtained in the pipe 48, the spring 51 of the actuator-mechanism 49 returns the same to its normal deenergized position, in which it resets the fuel-selector valves V7 and V8 at their light-fuel positions.

The main generator G is provided with a suitable excitation-means, or voltage-controlling means, for automatically or inherently giving this generator a voltage-characteristic, which is so related to the engine-speed, and so related to the load-characteristic of the traction-motors A1 and A2, that the main generator G, and the other engine-loading devices GX and E, require a driving-power which is just about equal to the optimum-efficiency horsepower output of the engine, at any given engine-speed. The means for thus controlling the main generator G involves certain field windings (not shown) on the generator, and certain excitation-means (not shown) for said field-windings, which I have not shown, as they are known in the art, and are unnecessary to an understanding of my invention, except to say that the generator G is controlled so as to properly absorb the available-power of the engine, at any engine-speed. Reference may be made to my copending application, Serial No. 340,840, for a suitable generator-exciting means, whereby the generator-excitation is properly correlated to the engine-speed, during the motoring operation of the vehicle.

During the braking operation, the main generator G has to have different excitation-characteristics, as is readily understandable to those skilled in the art. During these conditions, the main generator acts as a self-excited or a separately-excited motor, usually having certain compounding-winding effects, or such other excitation as enables the generator to operate as a motor, from the voltages which are generated by the traction-motors A1 and A2, which are now operating as generators, so that the main generator G now drives the gas turbine 3, causing it to absorb mechanical energy, particularly in its compressor-part 5. Here, again, I have refrained from showing the details of the generator field-winding and its control, which is unnecessary to an understanding of my present invention, except to know that the generator has a suitable excitation for enabling it to operate as a motor, in the manner just described.

The exciter E is provided with a separately excited field-winding EF, which is energized under the control of a braking-controller BC, so as to cause the exciter-voltage to be variable under the control of the engineman, according to the position of the braking-controller BC. For convenience of illustration, I have shown the braking controller BC as being a separate instrumentality, separate and distinct from the main or master controller MC, although it is a known practice, in other types of locomotive-control, to provide a suitable changeover-switch (not shown), which makes it possible to use the master controller for either motoring or braking, according to the setting of the changeover-switch, thus avoiding the necessity for providing two different controller-handles in the locomotive-cab.

It is fairly common to provide interlocking-means, mechanical as well as electrical, whereby the master controller MC must be in its off-position, before the braking controller BC can be moved, and whereby the braking-controller BC must be in its off-position, before the master controller MC may be moved. Since this is a well-understood practice, I have indicated some such interlocking-means in a very simple manner, in the form of a master-controller back-contact 52, which is connected between the positive battery-terminal (+) and the master-contactor terminal TM of the braking controller, so that the braking-controller BC is dead, unless the master controller MC is in its off-position.

The braking-controller BC is illustrated as having, in addition to the master-terminal TM, twelve other terminal-connections, marked T1 to T12, respectively. This braking-controller BC may have any number of on-positions, to give any degree of refinement of voltage-control for the exciter E. I have shown a braking-controller BC having eight on-positions, numbered 1 to 8, respectively, of which the positions numbered 1, 2 and 3 are preliminary positions, for establishing very weak dynamic-braking conditions, and for setting up desirable controls.

The first baking-position, No. 1, energizes the terminal-lead T1 from the positive input-lead TM, and this terminal T1 thereafter remains energized, in all eight of the on-positions of the braking-controller BC. The energization of the braking terminal T1 immediately does two things: it energizes the operating-coil B1 of the braking-relay or contactor B1, causing it to establish the main-circuit braking-connections, as previously described; and it energizes the exciter-field EF through field-circuit resistors R1, R2 and R3, with maximum resistance in circuit, so that the field-strength of the exciter E is at a minimum.

The first braking-controller position, No. 1, also energizes the terminal T11 from the terminal T12 which is connected to the positive battery-terminal (+), and this connection is maintained throughout all of the other on-positions of the braking-controller BC. This contact T11 is used to energize the blower-motors C1 and C2 when the braking connections are established, because the traction-motors A1 and A2 need cooling during braking, as well as during their normal motoring-operation. During the normal motoring-operation of the traction-motors A1 and A2, it may be remarked that the blower-motors C1 and C2 are energized through a master-controller make-contact 53.

Returning, now, to the operating-connections of the braking-controller BC, it will be noted that the No. 2 position of this controller energizes the terminal T7 from the positive terminal TM. Among other things, this terminal T7 is used to energize a relay R7, so as to cause that relay to open its back-contacts 54 and 55 when the braking-controller BC reaches its second position, in its advancing movement, thereafter holding said contacts 54 and 55 open until the braking controller reaches its No. 1 position, while being returned towards its off-position, causing these contacts to reclose on said No. 1 position. The T7 terminal is also used for another purpose which will be described later on.

The third on-position of the braking-controller BC energizes the terminal T8 from the positive terminal TM, and this T8 terminal is used to energize a relay R8, causing the latter to close its make-contact R8, which establishes a circuit from the T1 terminal, to energize the operating coil X8 of an auxiliary relay X8, which has a somewhat delayed dropout-action, as indicated by a lag-ring 56. The energization of the auxiliary relay X8 closes its three make-contacts 57, 58 and 59. These three contacts 57, 58 and 59 thus close on the third position of the braking-controller BC. The first one of these two contacts, namely the contact 57, serves as a holding contact, bypassing the relay-contact R8 so that the auxiliary relay X8 thereafter remains closed until a short time-delay after the deenergization of the T1 terminal, which does not occur until the braking-controller BC is returned all the way to its off-position. The lag-ring 56 of the auxiliary relay X8 thereupon interposes a slight time delay before this relay drops out and opens its three make-contacts 57, 58 and 59.

The off-position of the braking-controller BC is used to make a connection between its two terminal-circuits T9 and T10, which are included in the energizing-circuit for the fuel-transfer valve-magnet or coil V18. The complete energizing-circuit for this coil V18 starts with the positive battery-terminal (+), at which point a manually operable fuel-transfer pump-switch 60 energizes a terminal 61, which energizes the heavy-oil fuel-pump motor 4 across the battery-terminals (+) and (—). This switch 60 is normally closed, whenever the apparatus stands in condition for operation. The conductor 61 is also connected to a manually operable control-switch 62, which is connected to the terminal T10. In the off-position of the braking controller BC, this terminal T10 is connected to the terminal T9, which energizes the fuel-transfer air-switch coil V18.

The result of the V18 energization-connections just described is that, when the braking-controller BC is first moved from its off-position to any one of its braking-positions or on-positions, it deenergizes the fuel-transfer air-valve V18, causing the latter to return to its normal or unenergized off-position, thereby shutting off control-air from the pipe 44 which feeds the thermally responsive heater-controlling valve VT and the thermally responsive fuel-transfer valve VF. This shuts off steam from the fuel-oil heater 38, and it causes the fuel-transfer mechanism 49 to return the three-way fuel-selector valves V7 and V8 to their light-fuel positions, so that the braking operation is thereupon changed over from heavy-fuel operation to light-fuel operation of the engine 3, which is running at its idling speed at the time when the braking operation is initiated.

Let us assume, now, that the two controllers MC and BC are in their off-positions, and that the gas turbine 3 has not yet been started. When the gas turbine 3 is to be first put into operation, its operation is started by a starter-button STR, which is shown above the auxiliary-generator field-winding GXF in Fig. 1. The gas turbine is started by mechanically rotating the same until it attains a suitable starting-speed, such as 2100 R. P. M., at which time light fuel-oil can be admitted to its combustion-chambers 6. Any suitable mechanical-rotation means may be used for this purpose. By way of giving a simple example, which is easy to illustrate, I have shown the gas turbine as being started by the main generator, used as a motor, and energized across the battery-terminals (+) and (—) of the locomotive. The starter-button STR thus energized an auxiliary starting-switch or relay XS, which thereupon opens a main-circuit back-contact 63 and closes a main-circuit make-contact 64, and also closes an auxiliary-circuit make-contact 65. The main-circuit back-contact 63 is used to disconnect the traction-motors A1 and A2 during the starting operation, while the main-circuit make-contact 64 is used to energize the main generator, as a motor, across the battery-terminals.

When the gas-turbine is thus turned over at a predetermined speed, such as 2100 R. P. M., the output air-pressure of the compressor 5 becomes high enough, in the pipe 46, and in a branch-pipe of 46' connected thereto, to operate a diaphragm S2, which is shown at the end of the pipe-extension 46'. This diaphragm S2 thereupon closes a control-circuit switch-member S2, which energizes a circuit 66, which in turn energizes both of the pump-motors 10 and 22, so that light fuel-oil is supplied to the gas turbine. The speed-responsive switching-contacts S2 are illustrated as being in series with a manually operable start-stop switch 67, which is under the control of the engineman.

The gas turbine thereupon starts, on the light-fuel oil. Before it reaches its normal idling speed of 6000 R. P. M., say, for example, at 5500 R. P. M., the auxiliary air-pressure pipe 46' develops a pressure such to operate a diaphragm S4, which closes a control-circuit switching-contact S4.

Ordinarily, during the starting-operation, the previously described manually controlled switches 60 and 62 will be closed, and the braking-controller BC will be in its off-position, so that the fuel-transfer air-valve V18 will be actuated to its on-position. As soon, therefore, as the engine reaches its normal idling speed of 6000 R. P. M., or sometimes at a somewhat lower speed, enough air-pressure is supplied to the heater-diaphragm DH to open the steam-valve VH of the heater 38, thereby beginning to heat up the light fuel-oil which is being supplied, during the starting-period, to the gas turbine 3.

It takes a few minutes for the heater 38 to become suitably heated by its steam-supply, and it also takes a certain number of minutes for the critical parts of the gas turbine to achieve a sufficiently high operating-temperature for good burning of the heavy fuel-oil on which the turbine is to operate, once it is started. The heating time-constants of the heater 38 are preferably so correlated with the heating time-constants of the gas turbine, that a response to the fuel-oil temperature, as delivered by the heater 38, will amount to a response to the attainment of a desired temperature in the necessary working-parts of the turbine. When this temperature is reached, the thermally responsive fuel-controlling valve VF opens and, assuming that the predetermined idling-speed of 6000 R. P. M. has also been reached, the fuel-transfer mechanism 49 will now be operated, to move the three-way fuel-selector valves V7 and V8 to their heavy-oil positions, thereupon causing heavy fuel-oil to be supplied to the gas turbine. The fuel-transfer mechanism 49 is shown as being provided with a back-contact 69, which is in series with the light-oil pump motor 22, so that the light-oil fuel-pump 22' is stopped when the fuel-transfer actuating-mechanism 49 is moved from its light-oil position to its heavy-oil position.

Let us assume, now, that the engine 3 has been used to start up the diagrammatically illustrated locomotive, through the advancement of the master controller MC, and that a dynamic-braking operation is then desired. Arrangements may be made, whereby the braking operation may be entered into, either without requiring the engine-man to return the master controller MC to its off-position, or only after the master controller MC has been so returned, to its off-position, as is the case in the illustrated form of embodiment of my invention, in which the master-controller back-contact 52 must be closed, before dynamic braking can be obtained. Thus, in the illustrated form of my invention, the prime mover 3 is running at its idling speed, when dynamic braking is first applied by the advancement of the braking controller BC from its off-position to any one of its on-positions. Usually, the first braking-conditions, which are obtained when the braking controller BC is in its No. 1 on-position, are so "soft" that only the smallest amount of dynamic braking is obtained, barely enough to begin to slowly bunch the cars together, taking up the slack of the couplings in the train. This amount of braking is usually much too small to supply the power necessary to maintain the engine 3 at its idling speed, considering the various load-devices GX and E which the engine is driving at this time. It is necessary, therefore, at this time, to continue to feed fuel-oil to the engine at the idling rate.

As the engineman advances his braking-controller BC, however, the braking-power increases in a manner which will best be understood by reference to Fig. 2. In this Fig. 2, the small full-line curve 70 represents, in principle, not quantitatively, the amount of braking horsepower which can expectedly be absorbed by the idling engine 3 and its connected loads GX and E, at various engine-speeds, as the engineman gradually increases the braking-power by the advancement of the braking-controller BC. It will be noted that the engine speeds up, as it is being driven regeneratively by the main generator G which is now receiving electrical energy from the regenerating traction-motors A1 and A2.

As the engine is thus driven at higher and higher speeds, higher than its normal idling speed of say 6000 R. P. M., its air-compressor 5 rapidly increases the pressure of the compressed air which it feeds into the combustion-chamber 6, at a rate which varies with something like the second or third power of the engine-speed. A point will be reached, as at the speed S9 in Fig. 2, where the back-pressure of the compressed air in the combustion-chamber 6 will overcome the pressure of the input-fuel, under these externally driven idling conditions, thus causing the combustion at the burners 8 and 9 to begin to sputter, with imperfect combustion, finally becoming extinguished altogether, meanwhile leaving gummy deposits of uncombusted fuel in the combustion-chamber 6. Before this speed S9 is reached, it is therefore necessary, or extremely desirable, to shut off the fuel-input into the engine, as by means of the valves V1 and/or V2.

Therefore, it is a novel feature of my invention, that at some speed S8 which is less than the above-described flame-extinguishing speed S9 in Fig. 2, I provide a means for automatically energizing the first shutoff fuel-valve V1. This is accomplished, in Fig. 1, by means of a diaphragm S8, which corresponds to an air-pressure in the pipe-extension 46', corresponding to an engine-speed of 9500 R. P. M., or such other value as may be required in any particular case. The diaphragm S8 thereupon closes a switch S8, which energizes the operating-coil V1 of the first fuel-valve V1, so as to actuate said valve to its closed position. The energizing-circuit for this valve-coil V1 can be traced from the terminal T7 of the braking-contactor BC, thence through a wattmeter-relay contact WR which will be subsequently described, and then through the previously mentioned S4 contact, which closes at an engine-speed of say, 5500 R. P. M., and thence to a conductor 71, after which the circuit continues through the S8 contact to a conductor 71', then to the V1 coil, and thence to the negative bus-terminal (—). The valve-relay V1 has a make-contact 71'' which serves as a holding-contact for by-passing the speed-responsive switch S8.

It may be possible, in many instances, to shut off all fuel-input to the engine, in this manner, all at one time. It is usually preferable, however, for reasons which will presently be apparent, to shut off the engine-fuel in a plurality of stages, two stages being illustrated in Fig. 1, by way of example. Thus, the valve V1 shuts off the fuel-input into only one half, 8, of the fuel-burners 8 and 9 of the engine.

In consequence of this reduction in the fuel-input into the engine, as the result of the closure of the first fuel-valve V1, the engine-speed begins to decline, and as the engine-speed declines, the voltage of the engine-driven exciter E will also decline, assuming that the excitation of the exciter-field EF remains constant. Hence the excitation of the regenerating traction-motors A1 and A2 will be reduced, reducing the regenerative voltage, so that the horsepower which is supplied by the regenerating motors A1 and A2 will fall off, from the point S8 in Fig. 2, along some such curve as that which is indicated at 72.

It is desirable that the transition from the idling-condition braking-curve 70, in Fig. 2, to some intermediate dotted-line half-idling curve 73, with only half of the idling fuel-input, shall be along an approximately constant-power line 74, so that no great difference in the braking-power will be experienced during this brief transition-period when a change is being made from the curve 70 to the curve 73 in Fig. 2. It is usually desirable, therefore, at one or more intermediate points along this constant-power transition-curve 74, to introduce a means for automatically increasing the traction-motor excitation, as by increasing the excitation of the exciter-field EF, as shown at the point 75 in Fig. 2, so that the complete transition from the point S8 on the idling-curve 70 to the points S6 on the half-idling curve 73 shall be continued along a power-speed curve such as the curve 76 in Fig. 2, reaching an engine-speed S6, on the half-idling curve 73, wherein the braking power is approximately the same as was obtained at the speed S8 on the idling curve 70.

For effecting the automatic adjustment just mentioned, I have shown the first fuel-cutoff valve V1, in Fig. 1, as having an upwardly extending valve-stem which terminates in a make-contact 77, which energizes a sluggishly acting relay X1, which picks up and drops out slowly, under the retardation of a suitable retarding-means such as a dashpot 78. This energization of the relay X1 results in closing a make-contact 79 at about the point 75 which is shown in Fig. 2. This make-contact 79 is used to short-circuit the small field-resistance R2 which is included in the energizing-circuit of the exciter-field EF.

Before proceeding with complete shutting off of the fuel-input into the engine 3, it is usually desirable to proceed, for a short while, with a braking-operation using fuel-input into only the second half, 9, of the burners. During this time, the engine-speed may be increased from the value S6 to a somewhat higher value S7 on the half-idling curve 73, as shown in Fig. 2, at which time the braking-power is slightly increased. At this time, say at a speed of 8000 R. P. M. of the engine, it is desirable to obtain an automatic speed-response, as by means of the diaphragm S7 in Fig. 1, this diaphragm being energized from the compressed-air pipe-extension 46'. The S7 diaphragm closes a switch-contact S7, which energizes the second fuel-cutoff valve coil V2 from the conductor 71', that is, in a circuit which contains the V1 holding-contact 71'' and the circuit 71. This second fuel-valve V2 immediately picks up, shutting off the last of the fuel-supply to the engine 3, and at the same time energizing a holding-circuit make-contact 77, which bypasses the switch-contact S7 and the V1 holding-contact 71'''.

Any suitable control-means may be used, for effecting the control-operations just described. A simple control-means for this purpose may comprise an auxiliary speed-responsive relay SX, having an operating-coil SX which is energized from the conductor 71', through a back-contact 78 on the stem of the intermediate-speed diaphragm S7. Thus, when the conductor 71' is first energized, in response to the top-speed switch-contact S8, the intermediate-speed diaphragm S7 will have already responded, so that its back-contact 78 is then open, and the auxiliary speed-responsive relay SX will thus remain deenergized at this time. However, when the turbine-speed thereafter drops below the response-speed for the diaphragm S7, along the curve 76 in Fig. 2, the S7 back-contact 78 closes and energizes the auxiliary relay SX. This auxiliary relay SX has a make-contact 79 which is in series with the operating-coil V2 of the second fuel-cutoff valve V2, so that this valve V2 cannot be actuated until the SX make-contact 79 is closed as just described. The SX make-contact 79 thus prevents the second cutoff-valve V2 from being energized as soon as there is an energization of the circuit 71' for the first cutoff-valve V1, but when the intermediate-speed diaphragm S7 next picks up, in passing from the speed S6 to S7 along the line 73 in Fig. 2, the S7 switch-contact then energizes the operating-coil V2, which closes the second fuel-valve V2. The auxiliary relay SX has a holding-circuit including a make-contact 79' which keeps this relay energized from the conductor 71', thus bypassing the S7 back-contact 78.

The engine-speed again reduces, and at the same time the braking-power again falls off from the point S7 in Fig. 2, along some such curve as 80, and an automatic excitation-increase is again made, as indicated at 81 in Fig. 2, so that, as the transition-speed of the engine further reduces, the braking-power will fall off along some such curve as is indicated at 82 in Fig. 2, until the curve 82 intersects with the no-fuel curve 83, at some such speed as S5, in Fig. 2, affecting this transition in such manner that the braking-power which can be absorbed by the engine at its speed S7, during its half-idling condition 73, will be substantially the same as the braking-power which the engine can absorb at the speed S5 during its fuelless operating-condition, when all of the engine driving-power is being supplied by dynamic braking.

The automatic excitation-increase which is effected at the point 81, in Fig. 2, is obtained by providing the second fuel-cutoff valve V2 with an upwardly extending valve-stem which carries a make-contact 84, which energizes a sluggishly acting relay X2, which picks up and drops out slowly, with dashpot-action as indicated at 85. This energization of the relay X2 results in the closure of a make-contact 86 which short-circuits a small field-circuit resistance R3 at the point indicated at 81 in Fig. 2.

There are several conditions which should preferably be satisfied, in regard to the speed S5 at which transition is made to the no-fuel operating-condition of the engine, in which all of the engine-driving power is supplied by the braking-energy, as shown in Fig. 2. The most important of these conditions is that this speed S5 should not be greatly less than the normal idling speed, which has been assumed to be 6000 R. P. M. in the illustrative example. At least, this no-fuel braking-speed S5 should not be low enough to interfere with the proper operation of the auxiliaries which are driven by the engine during the braking period, or low enough to cause the auxiliary generator GX to be unable to supply any charging-energy, or sufficient charging-energy, to the battery-terminals (+) and (—). I have illustrated this minimum no-fuel braking-speed S5 as being exactly at the normal idling speed of 6000 R. P. M., although it is to be understood that this exact condition is not at all requisite. At any rate, this minimum no-fuel braking-speed S5, in Fig. 2, should be greater than the speed below which the speed-responsive switch S4 automatically reopens, which has been indicated as being at 5500 R. P. M., by way of example.

The engineman can increase the braking-power by further advancement of his braking-controller BC, until its full-on position is reached, at point 8. During this time, the engine is speeded up, as it absorbs more and more braking-power, until the engine reaches its maximum safe operating-speed, at some point such as is indicated at S10 in Fig. 2, at which time the engine is absorbing as much power as it safely can, unless certain additional measures are taken, as will shortly be described.

If more dynamic braking-power should be needed, than can be absorbed by the engine and its connected load at the maximum safe engine-speed of S10, of whatever value this may be, still further braking-power can be obtained by controllably restricting the discharge of exhaust-gases from the engine 3, during this fuelless braking-operation. To this end, I have shown the engine exhaust-outlet as having a series of shutters or vanes 87, which may be closed, more or less completely, in one or more stages, as is symbolically indicated by an operating-solenoid 87', which may be energized from the T1 BC-terminal, through a manually operable switch 88, provided that both of the fuel-valves V1 and V2 are in their actuated or closed positions, as indicated by the closure of two make-contact interlocks 89 and 89', respectively.

It will be understood, of course, that some sort of igniter or ignition-apparatus will be needed, for igniting the fuel-oil when it is first sprayed into the combustion-chamber 6 after a period of substantially no fuel-combustion. It has been common, in gas-turbine practice, to use a form of igniter in which a spark-plug is spring-pressed into a position in which it extends into the combustion-chamber 6, so as to be in a position to ignite the fuel-spray, whereupon the combustion-pressure is used to drive back a piston, against the spring-pressure, and thus withdraw the spark-plug contacts, out of the hot combustion-chamber, where they would be destroyed in a very short time.

I use a modification of such an igniter, as shown at 90 in Fig. 1. The spark-plug points 91 are carried by a piston 92, which is pressed in a direction toward the combustion-chamber 6, by a spring 93. In my novel illustrated form of igniter 90, the spring 93 backs up against a second piston 94, which normally rests against stops 95. Before the commencement of the ignition-operation, the first piston 92 is spring-pressed, up against two electrical contacts which are connected to two starting-circuit terminals 97 and 98, which are in series with a suitable starting-circuit, such as a circuit containing a vibrator VIB and a step-up spark-plug transformer 99, thereby energizing the spark-plug 91 from the secondary circuit 100 of this transformer. As soon as the fuel-combustion has been commenced, the combustion-pressure drives the first piston 92 back against suitable stops 101, thereby withdrawing the spark-plug 91 to a shielded position.

According to one feature of my present invention, I provide the rear end of the igniter 90 with an extra piston-chamber 102, to which I can admit air, at any suitable pressure, such as 140 pounds per square inch, through the previously described air-valve VA. This arrangement is needed because, as will be subsequently described, fuel-oil is substantially excluded from the combustion-chamber 6 during a portion of the braking-operation in which a substantial braking-power is being transmitted from the drive-wheels 1, to the gas turbine. Under these braking-circumstances, even though there is no combustion in the combustion-chamber 6, there will be a substantial air-pressure in this chamber, due to the supply of compressed air which is pumped into said combustion-chamber by the air-compressor 5, and hence the spark-plug 91 may be, and preferably is, in its retracted position.

At the termination of the braking operation, which may occur either at brake fade-out, or by a shutting off of the braking-controller BC, the gas turbine is still being rotated at a considerable speed, having been driven by the recuperative braking-energy. It is necessary, at this time, to recommence the combustion of light fuel-oil in the combustion-chamber 6, so as to restore the normal idling conditions of the gas turbine 3, and thence it is usually or sometimes necessary to momentarily turn on the air-valve VA, so as to inject enough air-pressure in the chamber 102, back of the second piston 94, to compress the spring 93, and so force the spark-plug 91 out or down into the combustion-chamber, where it will be effective to spark off a recombustion of the recommencing gas-spray in the combustion-chamber 6.

The circuit for the operating-coil or magnet VA of the igniter air-valve VA contains the R7 back-contact 54 and the X8 make-contact 58. It will be recalled that the R7 back-contact 54 opens, on the second brake-controller position, (when the braking-controller BC is being advanced), before the closing of the X8 make-contact 58, which occurs on the third position, during the advancing movement of the brake-controller BC, so that no actuation of the igniter air-valve VA is made during the advancing movement of the controller-handle. During the returning movement of the brake-controller BC, however, the X8 make-contact 58 is locked in, and remains closed until a short while after the braking-controller BC reaches its off-position. The R7 back-contact 54 recloses, during the returning of the braking-controller, when the braking-controller reaches its first position, or its on-position which is next adjacent to the off-position, and when this occurs, the igniter air-valve VA is energized to its open position, thereby thrusting forward the spark-plug 91 long enough for the fuel to reignite, as soon as fuel is again fed into the combustion-chamber 6, as will be subsequently described.

The complete excitation-circuit for the coil VA of the igniter air-valve VA extends from the positive battery-terminal (+), through the aforesaid contacts 58 and 54, and also through back-contacts 103 and 104 of the two fuel-valves V1 and V2, respectively, to a conductor 105, then through the coil VA, a back-contact 106 of a relay IX, and a back-contact 107 of a relay IR to the negative battery-terminal (—).

The ignition-circuit, containing the vibrator VIB and the step-up ignition-transformer 99, will be energized, near the end of the return-movement of the braking-controller BC, through the R7 back-contact 55 and the X8 make-contact 59, in the manner which has just been described for the igniter air-valve VA. The complete excitation-circuit for the vibrator VIB extends from the positive battery-terminal (+), through the aforesaid contacts 59 and 55, and also through back-contacts 108 and 109 of the two fuel-valves V1 and V2, respectively, to a conductor 110, then through the vibrator VIB, the igniter-interlock terminals 97 and 98, the primary of the ignition-transformer 99, and the coil IR of an ignition-relay IR, and thence to the negative battery-terminal (—).

In addition to this braking-operation energization of the ignition-circuit containing the vibrator VIB and the transformer 99, I also provide a connection, containing the auxiliary contact 65 of the auxiliary starting-switch XS, which comes into play, not during the braking-operation, but when the engine is first being started from standstill. At such a time, the XS make-contact 65 energizes the ignition-circuit by establishing a connection from the positive battery-terminal (+) to the conductor 110.

Before the fuel-spray can be ignited in the combustion-chamber 6, it is necessary, of course, for the fuel-oil to be admitted. This means that the fuel-pumps 10 and 22 must be operating, as they do when the contact S2 is closed in response to a predetermined engine-speed such as 2100 R. P. M. or more; and it also means that the fuel-shutoff valves V1 and/or V2 must be deenergized, so that they will be open and will admit fuel-oil to the engine. When the engine is first being started, as by means of the starter-button STR, the fuel-valves are deenergized or open, because their energizing-circuit is open at the terminal T7 of the braking-controller BC, which is then in its off-position. When the vehicle is in dynamic braking, with all fuel off, the fuel-supply is restored when the braking-controller BC is returned to either its No. 1 on-position or its off-position, thus deenergizing the terminal T7.

The ignition-circuit remains energized until the firing of the fuel-oil in the combustion-chamber 6 creates a sufficient combustion-pressure to drive the igniter-piston 92 back, so that it no longer makes contact between the circuit-terminals 97 and 98, thus automatically extinguishing the ignition-circuit, as soon as the ignition-operation has been completed.

The ignition-circuit may also be used to automatically deenergize the igniter air-valve VA. To this end, I have shown a delayed-dropout ignition-relay IR, the dropout movement of which may be made slightly sluggish, as by means of a lag-ring 112. When the ignition-circuit is first energized, it energizes the operating coil IR, and the ignition-relay IR opens its back-contact 107, which is in series with the operating coil VA of the igniter air-valve VA, thereby deenergizing this air-valve and permitting the same to return to its normal closed position. The ignition-relay IR also has a make-contact 114, which is in series with the operating coil of an auxiliary ignition-relay IX, to energize this auxiliary relay from the same circuit, 105, which energizes the coil VA of the air-valve VA of the igniter 90. The auxiliary relay IX promptly closes and seals itself closed, through a make-contact 115 which bypasses the IR contact 114, and at the same time the auxiliary relay IX opens its back-contact 106 which is in series between the VA coil and the IR back-contact 107.

Thus, when the braking-controller BC is being returned toward its off-position, as soon as it reaches its No. 1 on-position, the R7 contacts 54 and 55 reclose, and the contact-terminal T7 is deenergized, the latter causing the fuel-valves V1 and V2 to drop back to their open positions. If, as is usual, the combustion-chamber 6 of the engine has enough air-pressure in it to push the spark-plug 91 out of said chamber at this moment, the reclosures of the R7 contact 55 and the fuel-valve contacts 108 and 109 will not immediately energize the ignition-circuit, which is open at 97—98; but the reclosing R7 back-contact 54 and the reclosing fuel-valve back-contacts 103 and 104 will immediately energize the coil VA of the igniter air-valve VA, admitting air into the igniter chamber 102, and forcing the spark-plug 91 into the combustion-chamber 6, until the piston 92 of the igniter comes into a position in which it closes the circuit 97—98 and energizes the firing-circuit, thus producing a spark at the spark-plug 91.

The ignition-relay IR is energized as soon as the ignition-circuit is energized, and this ignition-relay serves as a means for deenergizing the air-valve coil VA at the contact 107. In case of a very quick ignition of the fuel-spray in the combustion-chamber 6, the ignition-circuit will remain energized for only a very brief moment, and hence the ignition-relay IR will be energized for only a brief moment. The lag-ring 112 makes this ignition-relay IR sufficiently sluggish, in its drop-out-time, to give the quick-acting auxiliary relay IX time to pick up and open its back-contact 106, so as to make sure that the igniter air-valve VA does not reclose when the IR contact 107 recloses, in case there should be any delay in the reopening of the X8 make-contact 58, which reopens a short while after the braking-controller BC has been returned all the way back to its off-position.

A dynamic-braking operation is terminated, by the engineman returning the braking-controller BC to its off-position. He can wait for the approach of brake fade-out, before shutting off his braking-controller BC; but when fade-out approaches, he should shut off this braking-controller, in order that a fuel-supply shall be again admitted to the engine, before the engine-speed becomes too low. This restoration of a fuel-supply to the engine is accomplished by a deenergization of the fuel-cutoff valves V1 and V2, as by moving the braking-controller BC back as far as its No. 1 position, so as to deenergize the contact-terminal T7, the conductor 71, and the fuel-valve coils V1 and V2.

To safeguard against the possibility that an engineman may leave the braking-controller BC full-on until a complete brake fade-out occurs, it is desirable to let the brake fade-out proceed to such a low braking-power that the engine-speed will drop to a value which is too low for a restoration of the fuel-consuming operation. Preferably, this engine-speed ought not be permitted to fall much below the normal idling-speed S5 of the engine, so as not to interfere with the correct operation of the various auxiliaries which are driven by the engine during the braking-operation.

To guard against letting the engine-speed drop too low, on brake fade-out, it may sometimes be desirable to provide a means for measuring, and responding, to a predeterminedly low braking-power, as by means of a watt-meter W, which is energized in accordance with the armature-voltage and the armature-current of the traction-motors A1 and A2, during the braking-operation. The current-response of the wattmeter W may be taken, for example, from a current-shunt 118, which is in series with the braking-relay contact 14. The wattmeter W is provided with a contact 119, which is opened in the deenergized position of the wattmeter, but which is closed at a small wattage-value. This wattmeter-contact 119 energizes the operating-coil WR of a wattmeter-relay WR, which has a relay-contact WR in the energizing-circuit for the conductor 71, from which the two fuel-stopping valves V1 and V2 derive their energizing-power.

Much of the operation of my invention has been indicated from time to time, as the description has proceeded. It may be helpful to review some of the important points here.

An important feature of the invention is the provision of means whereby substantially all fuel may be excluded from the fuel-burners 8 and 9 of the engine, during those portions of the dynamic-braking operation in which a substantial braking-power is being transmitted from the drive-wheels 1 to the engine. It is usually desirable to initiate the braking-operation at a time when the fuel-input into the engine is at least as high as the normal idling-speed fuel-input. When this fuel-input is being reduced during dynamic braking, either in a single fuel-cutoff step or in a plurality of steps, it is desirable that the resultant reduction in the engine-speed, as the engine-load is being taken over by the regenerative braking-power, shall be accomplished in such manner that nearly constant braking-power is being maintained under these transient speed-conditions, so that the magnitude of the braking power shall be under the control of the engineman, through the proper manipulation of the braking controller BC, without forcing the engineman to undertake to compensate for the transient conditions which are obtained when fuel is being automatically cut off from the engine, unknown to the engineman, during the braking-operation.

The preferred manner of accomplishing this approximately constant-braking transition, from idling fuel consumption to substantially no fuel consumption, may include one or both of my illustrated means to this end, namely, effecting the fuel-shutoff in as many stages as may be necessary, (two stages being illustrated, with the two fuel-valves V1 and V2), and effecting any kind of automatic increase in the exciter-field excitation, during this period, in as many steps as may be necessary or desirable, using any automatic means which would accomplish such a purpose, such as the time-delay relays X1 and X2 which automatically cut out the field-resistors R2 and R3 when the fuel-supply is being cut off, and which automatically restores these field-resistors when the fuel-supply is being turned on again.

A further useful feature of my invention is the use of the controllable vent-restriction means, such as the exhaust-vanes 87, for increasing the work which has to be done by the engine in pumping compressed air during the braking-operation, after all fuel-input has been cut off. It is important to observe that the fuel-input should be substantially completely cut off, before a vent-restriction should be undertaken, in order to prevent back-fires and to prevent the danger of driving fumes up into the locomotive.

It is also to be observed that the engine cannot develop its full braking-power unless the air-intake into the compressor 5 is left unimpaired during the braking-operation, both before and after the fuel-intake has been shut off.

It will be noted that I have provided various automatic operation-expedients, which are quite desirable in any engine-installation, especially a gas-turbine installation, in which the engine is to be used to absorb the braking-energy during dynamic or recuperative braking. These features include the means, such as the brake-controller terminals T9 and T10, whereby a fuel-transfer is made from inexpensive heavy fuel-oil to the more expensive light-fuel oil, upon the first application of dynamic braking, thus protecting the fuel-piping against subsequently becoming gummed up by the congealing of the heavy fuel-oil when the fuel-supply is cut off from the engine during the dynamic-braking operation.

I have provided three automatic devices for restoring the fuel-supply to the engine, as by deenergizing the fuel-cutoff valves V1 and V2, at the end of the dynamic-braking operation. Any one of these three means, or any combination of these means, may be utilized in any particular installation. The first one of these fuel-restoring means includes an automatic response to the falling off of the engine-speed, to a value which is not too much below the normal idling speed, as is accomplished by means of the S4 diaphragm and the S4 switching-contact, in response to an engine-speed of, say 5500 R. P. M., which is not too low for the successful operation of the auxiliaries which are driven by the engine during the braking operation.

A second fuel-restoring means which may be used, involves the wattmeter W, which responds to a fade-out of the dynamic-braking power. Upon a decrease of the regenerative braking-power to a predetermined braking-power, this wattmeter W deenergizes the wattmeter-relay WR, and thus causes the latter to open the WR contact in the energizing-circuit T7—71 for the two fuel-shutoff valves V1 and V2, causing the latter to return to their deenergized open positions.

The third means which I have shown, for restoring a fuel-supply to the engine at the end of a dynamic-braking operation, involves the brake-controller terminal-contact T7, which becomes deenergized when the brake-controller BC is returned as far as its No. 1 on-position. In this brake-controller position, there is an almost negligible braking-power, so that the braking-power is no longer sufficient to maintain the idling-speed of the engine 3 and its connected auxiliary loads GX and E. When the terminal-contact T7 is deenergized, the upper branch of this circuit, as shown in the drawing, deenergizes the two fuel-shutoff valve-magnets V1 and V2, causing the fuel-shutoff valves V1 and V2 to return to their on-positions.

When the fuel-valves V1 and V2 are restored to their deenergized open positions, at or near the end of the dynamic-braking operation, by any one of the three alternative fuel-restoring means just mentioned, the fuel-valve back-contacts 103—104 and 108—109 energize the previously described circuits for igniting the fuel in the combustion-chamber 6. In the particular form of embodiment of my invention which is shown in the drawing, I deenergize both of the fuel-shutoff valves V1 and V2 simultaneously, at or near the end of a dynamic-braking operation, so that the pairs of valve-interlocks 103—104 and 108—109 may be connected in series with each other. It is readily understandable, however, that other means or connections might have been used to activate the ignition-means in response to whichever valve drops out first, V1 or V2.

Another feature of my invention relates to the very necessary means for automatically reactivating the ignition-means, for reigniting the fuel in the combustion-chamber 6, as soon as that fuel is readmitted, by any one of the three means just mentioned, at the end of a braking-operation. In particular, I provide an igniter air-valve VA, which is energized by the fuel-valve back-contacts 103 and 104, as soon as the fuel-shutoff valves V1 and V2 are returned to their normal deenergized positions. The energization of the igniter air-valve VA thrusts the spark-plug 91 forward into the combustion-chamber, and causes the igniter-piston 92 to complete the spark-plug ignition-circuit of the terminals 97 and 98.

A still further detail of my invention relates to the operation of the fuel-transfer means which is one of the characteristic features of a gas turbine. At the beginning of the braking-operation, the opening of my BC terminals T9 and T10 results in the deenergization of the fuel-transfer air-valve V18, causing it to shut off and deenergize the fuel-transfer mechanism 49, so as to bring about a light-oil operation. The shutting of this fuel-transfer air-valve V18 also deenergizes the heater-diaphragm DH and the heater-valve VH, thus shutting off this valve and deenergizing the fuel-oil heater 38. This is done at the beginning of the braking-operation. At the end of the braking-operation, when the gas turbine 3 is to be operated again on the heavy fuel-oil, in its normal manner, the process of transferring back from light fuel-oil to heavy fuel-oil involves the reactivation or reopening of the fuel-transfer air-valve V18, at the BC terminals T9 and T10, and it further involves a reactivation of the heater 38, and a waiting-period which is necessary to make sure of the proper temperature-conditions, before the thermally controlled-valve VF will open and admit air-pressure to change the fuel-transfer actuator-means 49 from its light-oil position to its heavy-oil position.

These are only some of the high spots of the novel operational features of my invention. I wish to emphasize, again, that I have not attempted to show a complete circuit-diagram for an engine-power locomotive or vehicle having provision for absorbing the vehicle-braking power in the engine, especially its compressor, and in its connected auxiliaries. I have omitted many features which are practically necessary, but which are well known or obvious to the skilled workers, and have no direct bearing on the understanding and operation of my novel inventive features. While I have chosen only one illustrative form of embodiment, for illustrating my invention, I wish it to be understood that numerous substitutions of alternative elements and expedients may be made, as well as additions and omissions of certain refinements and safeguards, without departing from the essential spirit of my invention, at least in some of its broader aspects.

I claim as my invention:

1. An engine-powered self-propelled vehicle, having provisions for braking, and including: a fuel-consuming prime mover, normally requiring a certain minimum fuel-input to maintain a desirable idling speed, said prime mover having an air-input means and a fuel-input means; a power-interchanging means, whereby a driving torque may be transmitted to a drive-wheel of the vehicle from a shaft of the primer mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; and a braking-control means, whereby braking-power may be transmitted from said drive-wheel to said primer mover at a time when the vehicle is in motion and whereby substantially all fuel-input may be kept out of the prime mover during a portion of the braking-operation in which a substantial braking-power is being transmitted from said drive-wheel to said prime mover, said braking-control means being operative to substantially exclude fuel-input, but not to substantially exclude air-input, into the prime mover, during said substantial braking-operation.

2. The invention as defined in claim 1, including also: a controllable venting-means, whereby an air-discharge from said prime mover may be controllably restricted, during the braking-operation, after substantially all fuel-input has been excluded from the prime mover.

3. An engine-powered self-propelled vehicle, having provisions for braking, and including: a fuel-consuming prime mover, normally requiring a certain minimum fuel-input to maintain a desirable idling speed; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said primer mover and said power-interchanging means including, between the two of them, a means whereby said prime mover may operate at some idling speed without substantial power-interchange with said drive-wheel; and a braking-control means, whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover, said braking-control means including a means whereby an approximately constant braking-power is maintained during the prime-mover speed-drop which is produced by said exclusion of fuel-input.

4. An engine-powered self-propelled vehicle, having provisions for braking, and including: a fuel-consuming prime mover, normally requiring a certain minimum fuel-input to maintain a desirable idling speed; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; a braking-control means, whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover; and a low-speed-responsive means, responsive to conditions accompanying a predeterminedly low prime-mover speed which is nevertheless high enough for restarting the fuel-consuming operation of the prime mover, said low-speed-responsive means including a means tending to automatically recommence the feeding of a fuel-input into the prime mover and to cause the combustion of said fuel in the prime mover.

5. An engine-powered self-propelled vehicle, having provisions for braking, and including: a fuel-consuming prime mover, normally requiring a certain minimum fuel-input to maintain a desirable idling speed; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; a braking-control means, whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover; and a brake fade-out means, responsive to conditions accompanying a predeterminedly low braking-power transmission from the drive-wheel to the prime mover, said brake fade-out means including a means tending to automatically recommence the feeding of an idling-speed-maintaining fuel-input into the prime mover, and to cause the combustion of said fuel in the prime mover.

6. An engine-powered self-propelled vehicle, having provisions for braking, and including: a fuel-consuming prime mover, normally requiring a certain minimum fuel-input to maintain a desirable idling speed, said prime mover being of a type which normally operates on a heavy fuel-oil when it is supplying power for vehicle-propelling purposes, but which has to be started on a lighter fuel-oil, and has to be changed over to said lighter fuel-oil before said prime mover completely stops; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; a braking-control means whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover; a fuel selector valve-means, for changing over from one fuel-oil to the other; and a fuel-changing operating-means, for automatically causing a movement of said fuel-selector valve-means from heavy to light oil in response to an operation of the braking-control means.

7. An engine-powered self-propelled vehicle, having provisions for braking, and including: a fuel-consuming prime mover, normally requiring a certain minimum fuel-input to maintain a desirable idling speed, said prime mover being of a type which normally operates on a heavy fuel-oil when it is supplying power for vehicle-propelling purposes, but which has to be started on a lighter fuel-oil, and has to be changed over to said lighter fuel-oil before said prime mover completely stops; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; a braking-control means, whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover; a fuel-selector valve-means, for changing over from one fuel-oil to the other; a preheating-means, operable to preheat a fuel-oil input of the prime mover; a thermally responsive means, operable to an actuated condition in response to the attainment of a predetermined temperature by some prime-mover portion which is directly affected by the fuel-oil input-temperature; a means, responsive to an operation of the braking-control means from an off-position to a braking-position, for automatically substantially inactivating said preheating-means, and for also automatically causing a movement of said fuel-selector valve-means from heavy to light oil; a means, responsive to a return of the braking-control means to its off-position, for tending to automatically again operate said preheating-means; and a means, responsive jointly to an off-position of said braking-control means and to an actuated condition of said thermally responsive means, for tending to automatically cause a movement of said fuel-selector valve-means from light to heavy fuel.

8. An engine-powered self-propelled vehicle, having provisions for braking, and including: a fuel-consuming prime mover, normally requiring a certain minimum fuel-input to maintain a desirable idling speed; a power-interchanging means, whereby a driving torque may be transmitted to a drive-wheel of the vehicle from a shaft of the prime mover at times when a propelling power is to be applied to the vehicle, and whereby a driving torque may be transmitted to a shaft of the prime mover from said drive-wheel at other times when the motion of the vehicle is to be braked; said prime mover and said power-interchanging means including, between the two of them, a means whereby said prime mover may operate at some idling speed without substantial power-interchange with said drive-wheel; and a braking-control means, whereby braking-power may be transmitted from said drive-wheel to said prime mover at a time when the vehicle is in motion, and whereby substantially all fuel-input may be kept out of the prime mover during a portion of the braking-operation in which a substantial braking-power is being transmitted from said drive-wheel to said prime mover; said prime mover being a gas turbine, comprising a combustion-chamber, a fuel-intake means for feeding fuel into said combustion-chamber, an air-compressor for feeding compressed air into said combustion-chamber, an ignition-means for starting combustion in said combustion-chamber when fuel is first admitted after a period of substantially no fuel-combustion, a turbine-means which operates on the products of the combustion which takes place in said combustion-chamber, said turbine-means including a part which has a drive-connection to said air-compressor, and a part which has a drive-connection to said power-exchanging means, and a means whereby said two parts of the turbine-means are mechanically connected together, at least during the operation of said braking-control means.

9. The invention as defined in claim 8, characterized by said braking-control means being operative to substantially exclude fuel-input into the combustion-chamber, but not to substantially exclude air-input into the air-compressor, during said substantial braking-operation.

10. The invention as defined in claim 8, characterized by the ignition-means being resiliently biased toward a position in which its active fuel-igniting part is thrust forward into the combustion-chamber, said ignition-means being retractable into a position substantially out of the combustion-chamber in response to a moderately high gaseous pressure within said combustion-chamber, and said ignition-means including a forcible auxiliary thrusting-means whereby said active fuel-igniting part may be forcibly thrust forward into the combustion-chamber, against the gaseous pressure within said combustion-chamber, when fuel is again admitted to said combustion-chamber after a period of fuelless operation during vehicle-braking conditions.

11. The invention as defined in claim 8, characterized by the combustion-chamber of said gas turbine having a plurality of combustion-means, and further characterized by the fuel-exclusion means of the braking-control means including a means whereby the fuel-exclusion is made effective in less than all of the plurality of combustion-means at any one time, whereby a plurality of successive steps are taken in the transition from a fuel-consuming condition to a substantially fuel-free condition of the prime mover during vehicle-braking conditions.

12. A dynamic-braking control-assembly for an engine-powered, electrically propelled vehicle, including, in combination: a traction-motor which is to be controlled in both motoring and dynamic-braking operations; an electric generator, said generator serving as a generator during the motoring operation of the traction-motor, and said generator serving as a motor during a dynamic-braking operation of the traction-motor; a fuel-consuming prime mover, having a drive-connection to the generator, said prime mover normally requiring a certain minimum fuel-input to maintain a desirable idling speed, said prime mover having an air-input means and a fuel-input means; a motoring-operation control-means, for energizing said traction-motor from said generator, while fuel is being consumed in said prime mover; and a dynamic-braking control-means, for energizing said generator as a motor, receiving power from said traction-motor operating as a generator, while said vehicle is in motion, said dynamic-braking control-means including a means for shutting off substantially all fuel-input, without substantially excluding air-input, into said prime mover during a portion of the dynamic-braking operation in which a substantial braking-power is being transmitted from said vehicle to said prime mover.

13. A dynamic-braking control-assembly for an engine-powered, electrically propelled vehicle, including, in combination: a traction-motor which is to be controlled in both motoring and dynamic-braking operations; an electric generator, said generator serving as a generator during the motoring operation of the traction-motor, and said generator serving as a motor during a dynamic-braking operation of the traction-motor; a fuel-consuming prime mover, having a drive-connection to the generator, said prime mover normally requiring a certain minimum fuel-input to maintain a desirable idling speed; a motoring-operation control-means, for energizing said traction-motor from said generator, while fuel is being consumed in said prime mover; a dynamic-braking control-means, for energizing said generator as a motor, receiving power from said traction-motor operating as a generator, while said vehicle is in motion, said dynamic-braking control-means including a means for shutting off substantially all fuel-supply to said prime mover during a portion of the dynamic-braking operation in which a substantial braking-power is being transmitted from said vehicle to said prime mover; a means whereby an engineman may select any one of several control-conditions which affect the amount of dynamic-braking power; and a means whereby a compensating adjustment is automatically made in the selected control-conditions during the prime-mover speed-drop which is produced by said exclusion of fuel-input, whereby an approximately constant braking-power is maintained during said speed-drop.

14. A dynamic-braking control-assembly for an engine-powered, electrically propelled vehicle, including, in combination: a traction-motor which is to be controlled in both motoring and dynamic-braking operations; an electric generator, said generator serving as a generator during the motoring operation of the traction-motor, and said generator serving as a motor during a dynamic-braking operation of the traction-motor; a fuel-consuming prime mover, having a drive-connection to the generator, said prime mover normally requiring a certain minimum fuel-input to maintain a desirable idling speed; a motoring-operation control-means, for energizing said traction-motor from said generator while fuel is being consumed in said prime mover; a dynamic-braking control-means, for energizing said generator as a motor, receiving power from said traction-motor operating as a generator, while said vehicle is in motion, said dynamic-braking control-means including a means for shutting off substantially all fuel-supply to said prime mover during a portion of the dynamic-braking operation in which a substantial braking-power is being transmitted from said vehicle to said prime mover; and an auxiliary power plant, driven from said generator and from said prime mover, said auxiliary power plant supplying traction-motor ventilation-power and power for such other operation-maintaining services as may be needed during both motoring-operation and dynamic-braking operation, whereby the power for said auxiliary power plant is supplied by the traction-motor during sufficiently strong dynamic-braking operation, without any fuel-expenditure therefor during such operation; said vehicle being further characterized by: said prime mover being a gas turbine, comprising a combustion-chamber, a fuel-intake means for feeding fuel into said combustion-chamber, an air-compressor for feeding compressed air into said combustion-chamber, an ignition means for starting combustion in said combustion-chamber when fuel is first admitted after a period of substantially no fuel-combustion, a turbine means which operates on the products of the combustion which takes place in said combustion-chamber, said turbine-means including a part which has a drive-connection to said air-compressor, and a part which has a drive-connection to said generator, and a means whereby said two parts of the turbine-means are mechanically connected together, at least during the operation of said dynamic-braking control-means; and said dynamic-braking control means including a means whereby said braking-operation is entered into with a prime-mover fuel-input at least as high as said minimum fuel-input which is normally required for idling, and a means for thereafter reducing the prime-mover fuel-input and the prime-mover fuel-combustion to substantially zero, in a plurality of stages which are sufficiently easy to make it possible to provide acceptably smooth braking and to make it possible to hold the prime-mover speed between an upper limit which is not too much above the normal idling speed for acceptable fuel-consumption, and a lower limit which is not too much below the normal idling-speed for acceptable auxiliary-power-plant operation.

15. The invention as defined in claim 14, characterized by the combustion-chamber of said gas turbine having a plurality of combustion-means, and further characterized by the fuel-exclusion means of the dynamic-braking control-means including a means whereby the fuel-exclusion is made effective in less than all of the plurality of combustion-means at any one time, whereby a plurality of successive steps are taken in the transition from a fuel-consuming condition to a substantially fuel-free condition of the prime mover.

16. The invention as defined in claim 14, in combination with: a controllable venting-means, whereby an air-discharge from the prime mover may be controllably restricted, during a braking-operation, after substantially all fuel-input has been excluded from the prime mover.

References Cited in the file of this patent

UNITED STATES PATENTS

| | | |
|---|---|---|
| 1,680,025 | Losel | Aug. 7, 1928 |
| 2,053,446 | Rubel et al. | Sept. 8, 1936 |
| 2,336,052 | Anderson et al. | Dec. 7, 1943 |
| 2,337,717 | Hines | Dec. 28, 1943 |
| 2,393,622 | Adams et al. | Jan. 29, 1946 |
| 2,397,226 | Weybrew | Mar. 26, 1946 |
| 2,409,740 | Dilworth et al. | Oct. 22, 1946 |
| 2,510,753 | Multhaup | June 6, 1950 |
| 2,600,320 | Potter | June 10, 1953 |
| 2,658,154 | Brancke et al. | Nov. 3, 1953 |
| 2,663,803 | Warrick et al. | Dec. 22, 1953 |

OTHER REFERENCES

The Ford Model A Car, Pagé Norman W. Henley, Publishing Co., 2 West 45 St., N. Y., published 1930.